United States Patent [19]
Woods

[11] 3,932,252
[45] Jan. 13, 1976

[54] PROCESS FOR THE MANUFACTURE OF COMPOSITE FOAM AND FABRIC ARTICLES

[75] Inventor: Terrill Wayne Woods, Cedar Falls, Iowa

[73] Assignee: Deere & Company, Moline, Ill.

[22] Filed: Oct. 18, 1974

[21] Appl. No.: 515,865

[52] U.S. Cl. ............... 156/245; 156/285; 156/289; 264/46.4; 264/46.6; 264/46.8
[51] Int. Cl.² ......................................... B29D 27/04
[58] Field of Search ........ 156/245, 285, 289, 77–79, 156/90; 264/45.1, 46.4, 46.6, 46.8, 48; 117/6

[56] References Cited
UNITED STATES PATENTS

| | | | |
|---|---|---|---|
| 2,651,119 | 9/1953 | Harrington | 117/6 |
| 3,016,318 | 1/1962 | Sudman | 264/46.4 |
| 3,034,915 | 5/1962 | Kornbluth | 117/6 |
| 3,187,069 | 6/1965 | Pincus et al. | 264/46.6 |
| 3,258,511 | 6/1966 | McGregor | 264/46.4 |
| 3,431,331 | 3/1969 | Pincus et al. | 264/46.4 |

*Primary Examiner*—Caleb Weston

[57] ABSTRACT

A process for making composite articles, such as upholstery, filled with a cellular polyurethane foam covered by a breathable, porous fabric includes coating one surface of the fabric and the pores therein with a strippable coating. The fabric is then placed in a mold with the coating against the inside of the mold and is pulled down into conformity with the mold by vacuum. A liquid polyurethane foam resin is poured in place behind the fabric and foamed to a flexible solid state. The article is removed from the mold and the coating is stripped to complete the process.

13 Claims, 3 Drawing Figures

PROCESS FOR THE MANUFACTURE OF COMPOSITE FOAM AND FABRIC ARTICLES

BACKGROUND OF THE INVENTION

The present invention relates generally to the manufacture of composite articles filled with a cellular foam covered by a fabric and more particularly relates to a method for manufacturing upholstery having a resilient, open cell foam covered by a breathable fabric.

In the past, fabric covered foam plastic articles using airimpervious fabrics were made by shaping the fabric to the contour of the mold, applying vacuum to hold the fabric in the mold, and then pouring the foam on top of the fabric in the mold. Breathable fabrics of the type used to make seats coming in contact with the body generally were not used in these articles because of the difficulty of drawing them down into the mold by vacuum and because the foam tended to strike through the pores of the fabric causing the fabric to lose its desirable feel, appearance, and/or firmness.

A partial solution was realized by treating the breathable fabric with a polymeric fluorocarbon sizing compound to prevent strike through as disclosed in the U.S. Pat. No. 3,016,318 granted to Charles F. Sudman on Jan. 9, 1962, but the problem of drawing the fabric into a mold by vacuum still existed.

An alternate partial solution involved the use of an air-impervious film backing behind the breathable fabric so that the vacuum could not be lost through the fabric and mechanically puncturing the film with a plurality of pins after forming as disclosed in the U.S. Pat. No. 3,258,511 granted to William A. McGregor, Jr. on June 28, 1966. However, this left a film which had to be bonded to both the fabric and the foam while leaving the breathing area limited to the points of mechanical puncture rather than the entire breathable surface of the fabric.

Thus, neither of the partial solutions, individually or combined, has solved the problems associated with the manufacture of breathable fabric covered foamed article.

SUMMARY OF THE INVENTION

It is a general object of the present invention to provide a process for manufacturing vacuum-mold formed, foamed articles with breathable fabric covers not subject to strike through and related problems.

It is a subsidary object of the present invention to permit the entire surface area of the breathable fabric in contact with an open-cell foam to provide free passage of air for ventilation.

These objects are accomplished by coating the outside of the fabric with an easily removable, air and foam impervious coating, manufacturing the article, and removing the coating.

The above and additional objects and advantages of the present invention will become apparent to those skilled in the art from a consideration of the following detailed description when taken in conjunction with the accompanying drawings.

DESCRIPTION OF THE PREFERRED EMBODIMENTS

Figure 1:
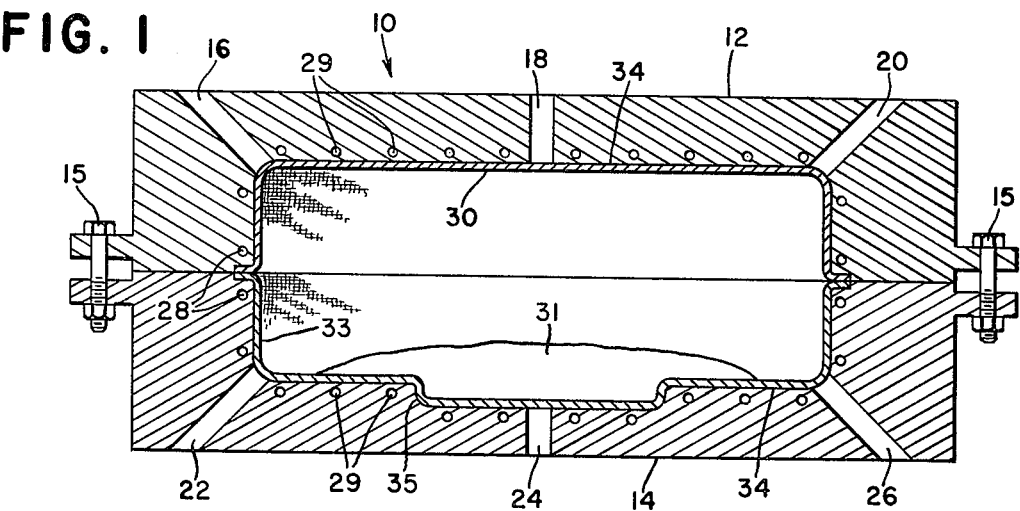
FIG. 1 is a cross sectional view of a vacuum-mold apparatus suitable for making a breathable vinyl covered or cloth covered seat.

Referring to the drawings, FIG. 1 shows a cross sectional view of a mold 10 having two halves 12 and 14 suitable for use in the manufacture of a breathable fabric covered seat. The mold 10 is lined with two pre-cut lengths of a fabric cover such as a textile material or porous vinyl 30 and 33 which may be either flat or pre-formed to the contours 35 of the mold cavity. These lengths of vinyl 30 and 33 are coated by spraying, brushing, etc. on one side with a strippable coating 34 as is commonly known in the art. The primary chaacteristics of the coating on the vinyl are that it be substantially air and foam impervious and that it adhere to the surface of the vinyl and fill the pores of the vinyl with sufficient adhesion to permit vacuum draw down of the combination into the mold while still being relatively easy to strip off.

Of the large number of these coatings known, the preferred embodiment uses a Spraylat compound manufactured by Spraylat Corp., Mount Vernon, N.Y., which is characterized by being a water base, strippable plastic coating designed to mask and protect formed vinyl plastisol and ABS parts during foam-in-place processing. The compound may be sprayed on and has the following mechanical characteristics: a density of 8.4 pounds per gallon; a tensile strength of 2000 pounds per square inch; a maximum elongation of 250 percent; and an adhesion of 0.1 pounds per lineal inch to ABS. Due to its low adhesion characteristics, the Spraylat compound may be easily hand stripped or blown off with air.

The lengths of vinyl 30 and 33 are placed in the mold so that the coated surface will be between the vinyl and the mold 10. A foamable compound 31, such as a cellular polyurethane or rubber latex, is placed in the bottom half of the mold. The edges of the mold 10 with the vinyl trapped inbetween are then clamped by bolts 15. The vacuum is applied to the mold 10 through vacuum conduits 16, 18, 20, 22, 24 and 26 to draw the vinyl 30 and 33 down to fit the contour of the mold cavity and air trapped in the mold cavity between the vinyl is evacuated by conventional means.

Figure 2:
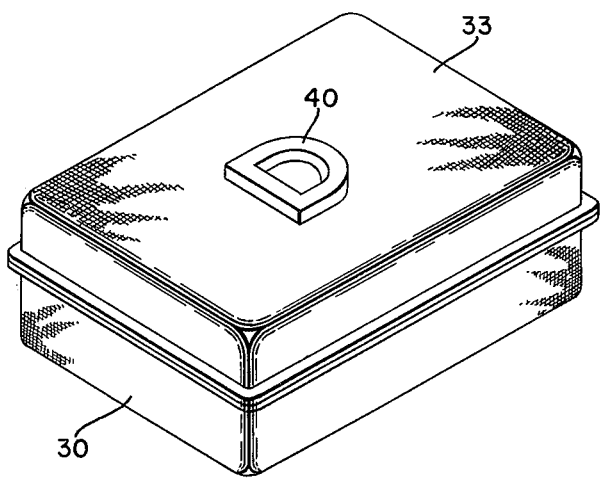
FIG. 2 is an isometric view showing a completed article.

The foamable compound 31 expands filling the mold cavity and pressing the vinyl 30 and 33 against the mold 10. During foaming, or if desired after foaming, heating elements 28 are actuated to bond the adjacent lengths of vinyl 30 and 33 together or heating elements 29 are actuated to cause heat stretching and forming of the vinyl or to provide embossing 40 of the surface of the material. Heating is then discontinued and the mold opened to permit removal of the foam seat having substantially the configuration disclosed in FIG. 2.

In most cases, it is desirable that the foam and the vinyl adhere because it prevents relative motion between the two which could cause wrinkling of the vinyl. The stripping compound will not affect the adhesion since it only covers the outer surface of the vinyl and merely fills the pores but does not strike through to cover the inner surface to which the foam will adhere.

After removal of the vinyl covered foam seat, the strippable coating is easily hand stripped or blown off with air or left in place until delivery to the final user.

Figure 3:
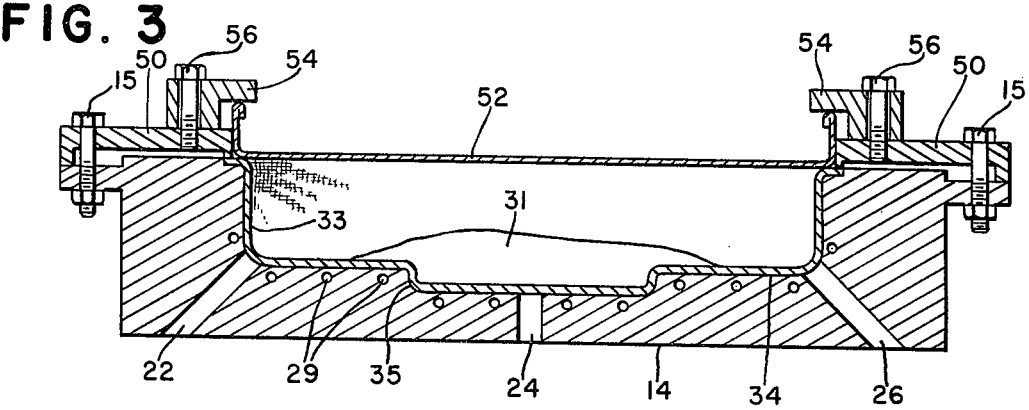
FIG. 3 is a cross sectional view of a vacuum-mold apparatus suitable for making an alternate breathable vinyl covered or cloth covered seat.

In an alternate embodiment shown in FIG. 3 with the same parts having the same numbers as in the prior embodiment, the mold half 14 is lined with a pre-cut length of vinyl 33. The mold facing side of the vinyl 33 is coated by spraying, brushing, etc. with the strippable coating 34.

The edges of the vinyl 33 are trapped by a clamping ring 50 and bolts 15. The vacuum is applied to the mold half 14 through vacuum conduits 22, 24, and 26 to draw the vinyl 33 down to fit the contour of the mold cavity.

The foamable compound 31 is usually placed in the mold cavity behind the vinyl 33 and begins to expand to fill the mold cavity. As the expansion occurs, a conventional rigid structure or seat bottom 52 is placed over the mold cavity and quick-clamped in place on the ring 50 by conventional means such as by hold down brackets 54 swivelly mounted on stripper bolts 56. Air is allowed to escape from the mold cavity in a conventional manner and the foam expands to contact and bond to the seat bottom 52.

As an alternative, the foamable compound 31 may be inserted through a hole in the seat bottom 52 after it is clamped into place.

Before, during, or after foaming, heating elements 29 are activated as desired to cause heat stretching and forming of the vinyl or to provide embossing 40 of the surface of the material. Heating is then discontinued, the clamp ring 50 removed, and the completed foam seat removed.

After removal from the mold, the strippable coating is easily removed or left in place until delivery to the final user.

Having thus described the construction and operation of the preferred embodiment of this invention, various modifications within the spirit and scope of the invention will become apparent to those skilled in the art and can be made without departing from the underlying principles of the invention as defined in the claims.

I claim:

1. A process for making composite articles having a porous cover which will breathe and having a foamed core which does not extend through the pores of the cover, the process comprising: coating one side of a porous cover with a strippable, foam impervious coating; lining a mold with the porous cover with the strippable coating facing the mold; foaming a foamable mixture in the mold to form a composite article; removing the article from the mold; and stripping off the strippable coating.

2. The process for the manufacture of composite articles as claimed in claim 1 wherein coating one side of a porous cover with a strippable coating includes filling the pores in the porous cover.

3. The process for the manufacture of composite articles as claimed in claim 2 wherein the porous cover is comprised of a flexible perforated plastic sheet material or a textile material.

4. The process for the manufacture of composite articles claimed in claim 2 wherein the foamable mixture forms a flexible, open-cell polyurethane foam.

5. The process for the manufacture of composite articles as claimed in claim 2 wherein the porous cover has a plurality of component porous cover parts and the process includes bonding the porous cover parts to each other.

6. The process for the manufacture of composite articles as claimed in claim 2 includes bonding a rigid structural element to the porous cover.

7. A process for manufacturing composite articles having a porous cover which will breathe and having a foam core which does not extend through the pores of the cover, the process comprising: coating one surface of a porous cover with a strippable, foam impervious coating; placing the cover over a mold with the strippable coating facing the mold; clamping the cover to the edge of the mold; applying vacuum to the mold to vacuum form the cover into the shape of the mold; foaming a liquid foamable mixture in the mold to form a composite article; releasing the vacuum; unclamping the cover from the mold; removing the article from the mold; and stripping off the strippable coating.

8. The process for the manufacture of composite articles as claimed in claim 7 wherein coating one side of a porous cover with a stippable coating includes filling the pores in the porous cover.

9. The process for the manufacture of composite articles as claimed in claim 8 wherein the porous cover is comprised of a flexible perforated plastic sheet material or a textile material.

10. The process for the manufacture of composite articles claimed in claim 8 wherein the foamable mixture forms a flexible, open-cell polyurethane foam.

11. The process for the manufacture of composite articles as claimed in claim 8 wherein the porous cover has a plurality of component porous cover parts and the process includes bonding the porous cover parts to each other.

12. The process for the manufacture of composite articles as claimed in claim 8 including applying heat to the mold to aid in causing the cover to conform to the shape of the mold after applying the vacuum.

13. The process for the manufacture of composite articles as claimed in claim 8 includes bonding a rigid structural element to the porous cover.

* * * * *